(12) United States Patent
Edfeldt

(10) Patent No.: US 7,147,402 B2
(45) Date of Patent: Dec. 12, 2006

(54) SUBMARINE PIPELINE SPOILER

(76) Inventor: Michael Paul Edfeldt, 3005 Longleaf La., Helena, AL (US) 35080

( * ) Notice: Subject to any disclaimer, the term of this patent is extended or adjusted under 35 U.S.C. 154(b) by 0 days.

(21) Appl. No.: 11/155,239

(22) Filed: Jun. 17, 2005

(65) Prior Publication Data

US 2005/0232706 A1  Oct. 20, 2005

Related U.S. Application Data

(63) Continuation of application No. 10/797,319, filed on Mar. 10, 2004, now abandoned.

(51) Int. Cl.
*F16L 1/16* (2006.01)
(52) U.S. Cl. .................................................. 405/159
(58) Field of Classification Search ................ 405/158, 405/159, 172, 184.4, 211; 138/106
See application file for complete search history.

(56) References Cited

U.S. PATENT DOCUMENTS

| | | | |
|---|---|---|---|
| 2,674,857 A | * | 4/1954 | Fortes ......................... 405/132 |
| 3,454,051 A | * | 7/1969 | Goepfert et al. ............ 405/158 |
| 4,648,745 A | * | 3/1987 | Hulsbergen .................. 405/159 |
| 4,722,367 A | * | 2/1988 | Swink et al. ................ 138/178 |
| 6,347,911 B1 | * | 2/2002 | Blair et al. .................. 405/216 |
| 6,561,734 B1 | * | 5/2003 | Allen et al. .................. 405/216 |
| 6,695,540 B1 | * | 2/2004 | Taquino ...................... 405/216 |
| 6,896,447 B1 | * | 5/2005 | Taquino ...................... 405/216 |

FOREIGN PATENT DOCUMENTS

| | | | |
|---|---|---|---|
| EP | 0466219 | * | 1/1992 |
| EP | 0717223 | * | 6/1996 |
| GB | 2335248 | * | 9/1999 |
| JP | 07318275 | * | 12/1995 |

* cited by examiner

*Primary Examiner*—Sunil Singh
(74) *Attorney, Agent, or Firm*—24IP Law Group USA; Timothy R. DeWitt

(57) ABSTRACT

A method and apparatus for stabilizing and burying a conduit in a waterbed is disclosed. A plurality of spoilers are placed on the conduit at longitudinally and radially different positions to promote self-burial, reduce vortex-induced vibration, prevent upheaval buckling, minimize future corrective work by continuous reburial of the under water conduit or pipeline.

11 Claims, 9 Drawing Sheets

SUBMARINE PIPELINE SPOILER

CROSS-REFERENCE TO RELATED APPLICATIONS

This is a continuation of U.S. patent application Ser. No. 10/797,319 filed on Mar. 10,2004, now abandoned.

STATEMENT REGARDING FEDERALLY SPONSORED RESEARCH OR DEVELOPMENT

Not applicable.

FIELD OF THE INVENTION

The present invention relates to the field of burying underwater pipelines, and more specifically to a method and device for promoting self-burial and/or stabilization of underwater pipelines.

BACKGROUND OF THE INVENTION

A smooth and circular conduit often has a tendency toward self-burial, but the effect often is insufficient, so that the conduit is easily exposed again and/or the time for self-burying is very long, with the inherent danger of damage by anchors, fishing gears or the like. In view regulations of several governments that require that a conduit be buried so much within one year that there is at least a covering layer of a height of 20 cm above it, various methods of burying conduits have been proposed.

Prior methods of burial have included the making of trenches by dredging, by cutting with rotary cutters or by strong water jets and to position the pipeline or conduit therein. Such prior methods have been realized in such a way that the conduit has lowered to the bottom underwater during the preparation of such a trench. After positioning of the conduit in the trench, the trench may be filled up above the conduit with the material which first has been removed for making the trench so as to obtain sufficient earth material above the conduit, so that it is not again exposed by the stirring action of the water flows along the bottom. These traditional methods of burying conduits suffered from numerous problems, including, but not limited to, adverse environmental impact and cost.

A method of self-burial of a conduit in a seabed using protruding parts such as fins was disclosed in U.S. Pat. No. 4,648,745, entitled "Method and Device for Burying a Conduit in the Bottom of a Waterbed," which is incorporated by reference herein in its entirety. That patent disclosed a method in which protrusions such as fins are provided on or in the vicinity of the conduit, which cause disturbances in the flow of water near the conduit to erode the bottom of the waterbed in such a way that the conduit will be buried.

It has appeared that by application of the invention horizontal water flows near the conduit generate flow disturbances and/or turbulences, swirling up, dragging with it and removing the bottom material to the side of and in many cases also below the conduit, so that the conduit sinks into the bottom by its own weight, which process proceeds until the conduit is sufficiently buried, after which the depression, which is thereby formed in the proximity of the conduit, silts up so that so much earth will cover the conduit that it remains buried safely.

The method of that patent was realized in such a way that the protruding parts were provided at a horizontal distance from the conduit and extending substantially parallel thereto, provided on or in the bottom, and this possibility could be combined with the application of one or more protruding parts on the conduit itself. That design was believed to be particularly advantageous when the horizontal flows along the bottom in the water are in one direction only instead of switching to and fro by tide currents.

The patent further noted that tilting of the conduit may occur in certain environments, and if the conduit may easily tilt to a more considerable extent, it was possible to provide a number of protruding parts, distributed over a greater part of or over the entire periphery of the conduit so that always the parts protruding in a direction to be effective for the erosion generate sufficient disturbance in the water flow for burying erosion. For example, in order to guide a downwardly directed swirl generated at the luff side and directed downwardly along the wall of the conduit, an embodiment was disclosed wherein the conduit had a radial longitudinal fin in an inclined position in the upper part e.g. at an angle of about 45.degree. to the horizontal direction. An even better guiding of said swirl was obtained by curving such a fin concavely downwardly. If the water flow was alternating as by the tide, there would normally be two such fins on the conduit.

Several advances in the use of protrusions or fins to promote self-burial of pipelines are disclosed in European Patent Specification No. EP 0466219 B1, entitled "Pipeline with Ground Anchors," which is incorporated by reference herein in its entirety. That European patent disclosed a "seat" and "spoiler" structure in which the spoilers would be mounted to a seat that would "grab" across part of the outer surface of a pipe. The seat and spoiler would then be kept in place on the pipe by metal straps.

In practice, the spoilers or fins typically are aligned approximately over dead center, slightly spaced along the length of a section of pipe 110 such as is shown in FIGS. 1 and 3. The spoilers typically have a two-piece structure having a seat or saddle 112 and a fin 114, such as is shown in FIG. 2. The fins and seats typically are secured to the pipe 110 using metal straps.

A further advance was disclosed in European Patent Specification No. EP 0717223 B1, entitled "Assembly of pipelines intended to lie on a seabed and saddle for securing a second pipeline to a first pipeline," which is incorporated by reference herein in its entirety. That patent disclosed a structure of the seat for protrusions from a pipeline in the form of a saddle for accommodating a second pipe.

SUMMARY OF THE INVENTION

The present invention provides a new and different method and apparatus for stabilizing and burying a conduit in a pipeline. The method for promoting self-burial and stabilization of a conduit in the bottom of a water bed comprises the steps of providing a first protruding part approximately over dead center along a first portion of the conduit with the first protruding part being securely connected to said conduit; providing a second protruding part approximately 10° to 30° from over dead center on a second portion of the conduit different than the first portion with the second protruding part being securely connected to said conduit. The method may further comprise the step of providing a third protruding part on the conduit approximately 10° to 30° from over dead center in an opposite circumferential direction from the second protruding part on a third portion of the conduit different than the first and second portions with the third protruding part being securely connected to the conduit. The method likewise may comprise further protruding parts in alternating radial locations along the conduit.

The apparatus may comprise a seat and fin structure secured to a pipeline such as via metal straps. The spoiler seat further may provide for piggy-backing of a second pipeline or cable.

BRIEF DESCRIPTION OF THE DRAWINGS

The invention of the present application will now be described in more detail with reference to preferred embodiments of the architecture and method, given only by way of example, and with reference to the accompanying drawings, in which.

DESCRIPTION OF THE PREFERRED EMBODIMENTS

The present invention presents a new alignment of submarine pipeline spoilers that provides numerous advantages in terms of self-burial, re-burial, reduced vortex-induced vibration, upheaval buckling prevention, and environmental protection in certain marine environments.

Figure 1:
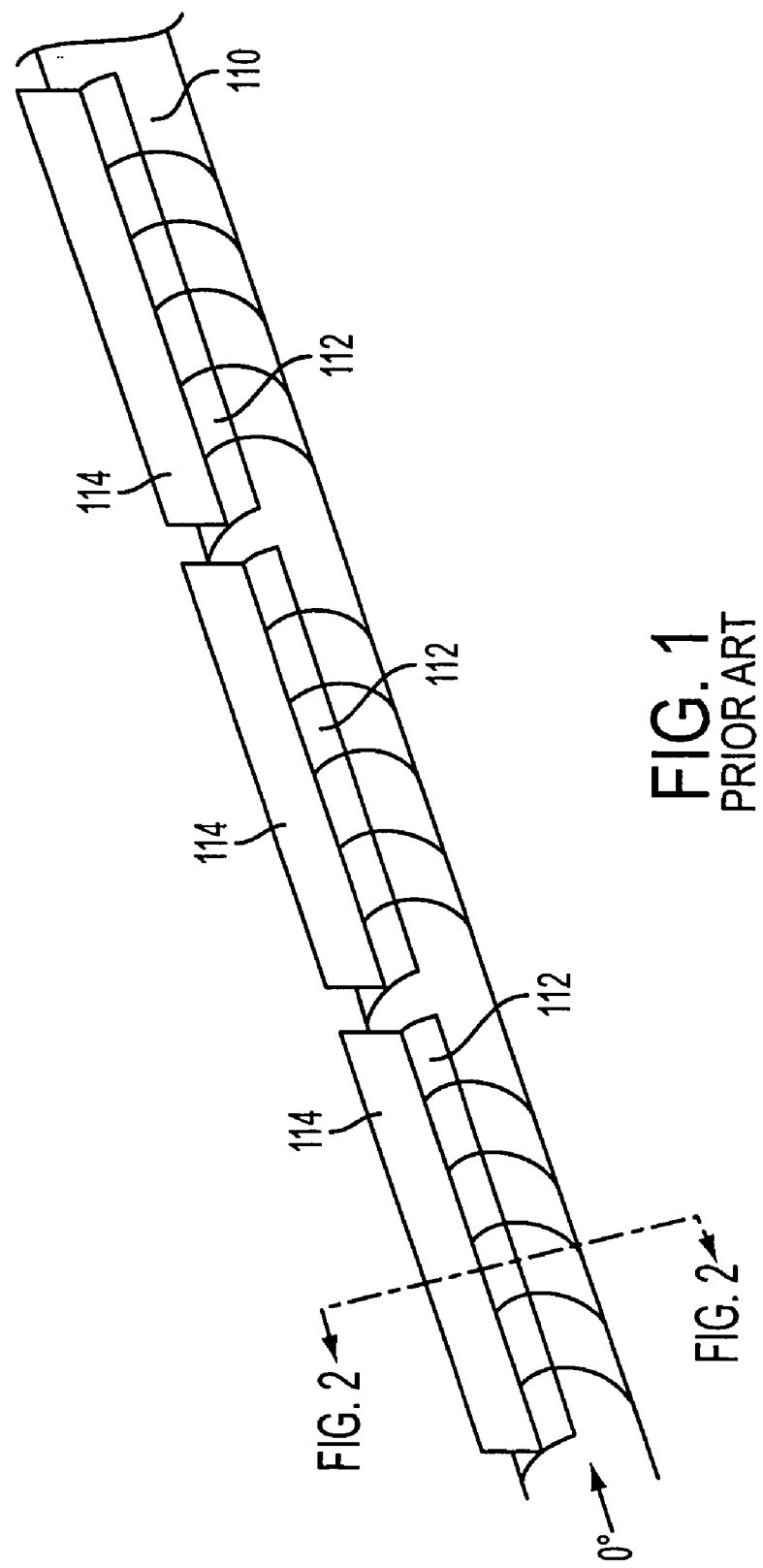
FIG. 1 is a perspective view of a conventional alignment of spoilers for self-burial of a conduit or pipeline.
Figure 2:
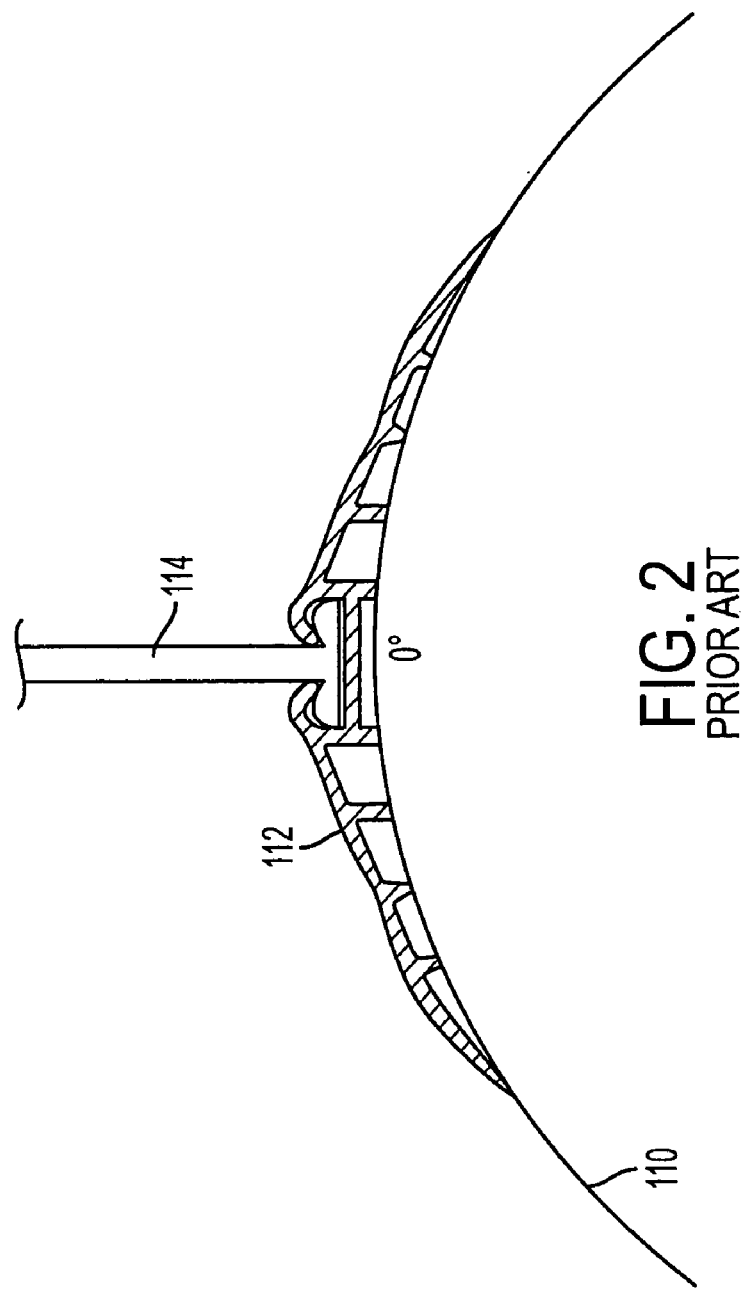
FIG. 2 is a cross-section of a conventional alignment of spoilers for self-burial of a conduit or pipeline.
Figure 3:
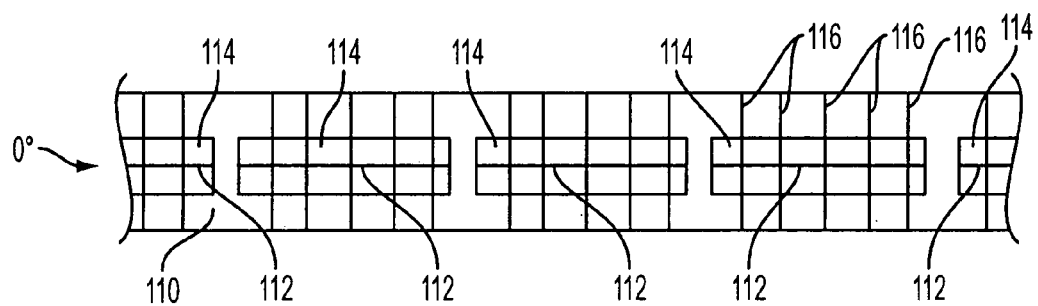
FIG. 3 is a top view of a conventional alignment of spoilers for self-burial of a conduit or pipeline.
Figure 4:
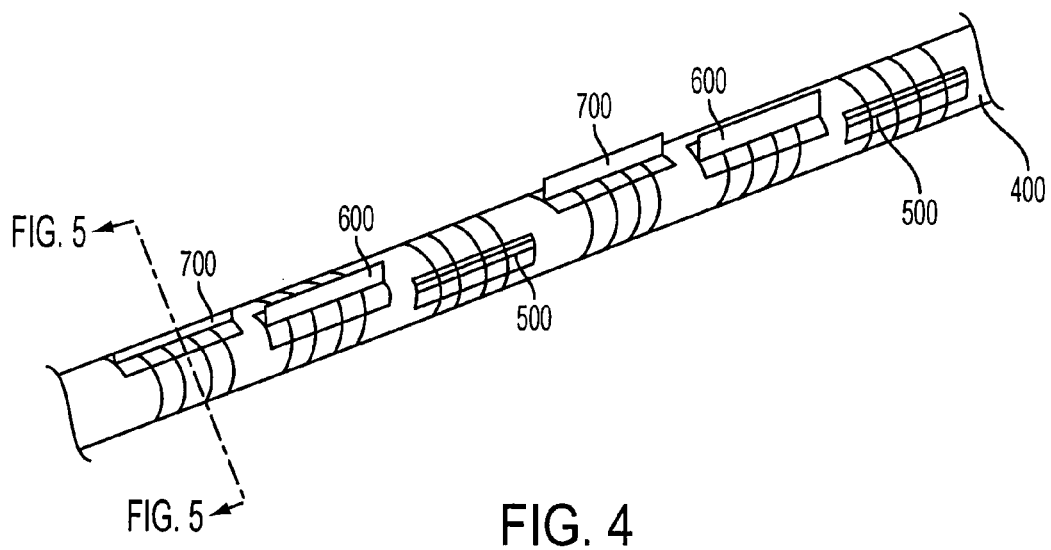
FIG. 4 is a perspective view of an alignment of spoilers for self-burial or stabilization of a conduit or pipeline in accordance with the present invention.
Figure 5:
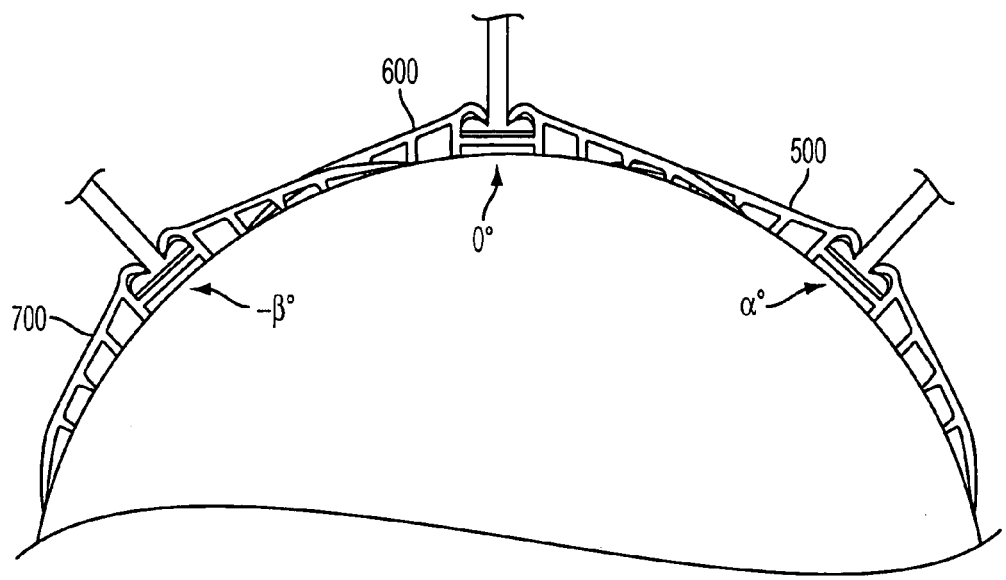
FIG. 5 is a cross-sectional view of an alignment of spoilers for self-burial or stabilization of a conduit or pipeline in accordance with the present invention.

As shown in FIGS. 4–5, the present invention involves radially alternating placement of spoilers along a length of pipe. A first spoiler 600 is secured to a pipeline 400 via bands or straps at a radial position that is approximately on top of dead center.

A second spoiler 500 is secured to the pipeline 400 at a longitudal position on the pipe spaced from spoiler 500 and at a radial position +α° from top of dead center, where $10° \leq \alpha \leq 30°$, and, in a preferred embodiment, α is approximately equal to 20°.

The longitudinal spacing between spoilers 600 and 500 may vary but is approximately four inches in a preferred embodiment. The spacing between spoilers is included to permit water flow between the spoilers. This water flow promotes self-burial of the pipeline. Alternatively, the spoilers could be placed adjacent to one another and opening could be incorporated into the fins to permit the water flow that promotes self-burial.

A third spoiler 700 is secured to the pipeline 400 at a longitudal position on the pipe spaced from spoiler 500 and at a radial position –β° from on top of dead center, where $10° \leq \beta \leq 30°$, and, in a preferred embodiment, P is approximately equal to 20°. The longitudinal spacing between spoilers 700 and 500 may vary but is approximately four inches in a preferred embodiment.

This pattern of radially alternating the placement of spoilers on a pipe may be repeated along a length of pipe. Further, the radial placement of spoilers 500 and 700 may be reversed.

Figure 6:
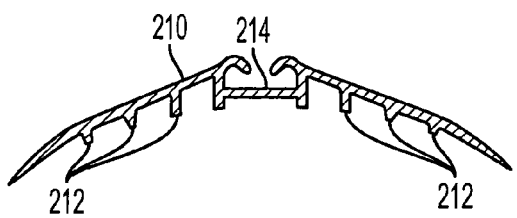
FIG. 6 is cross-sectional view of a seat for use with a spoiler for self-burial of a conduit or pipeline.
Figure 7:
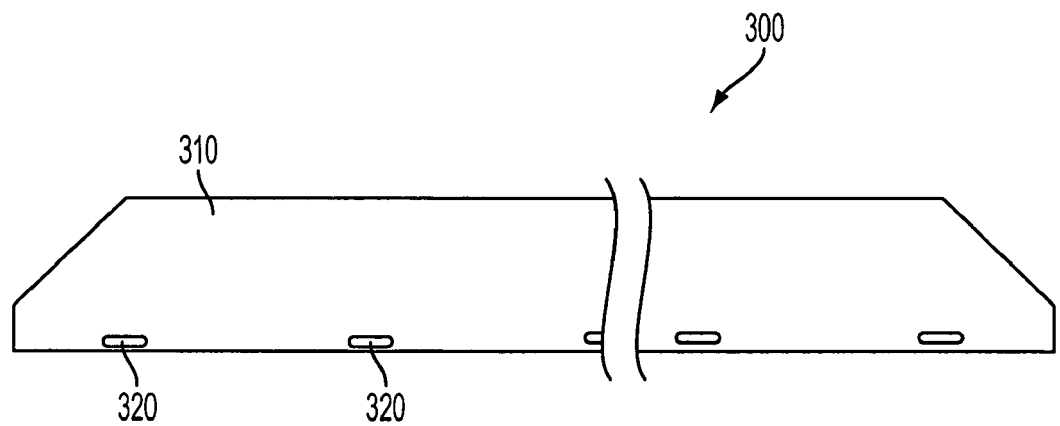
FIG. 7 is a side view of a fin for use as a spoiler for self-burial of a conduit or pipeline.
Figure 8:
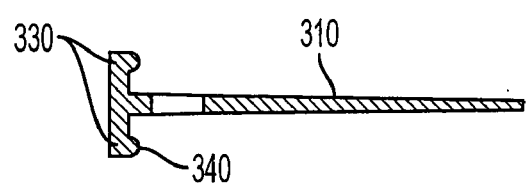
FIG. 8 is a cross-sectional view of a fin for use as a spoiler for self-burial of a conduit or pipeline.

The spoilers may be secured to the pipeline by any of a variety of means. In one embodiment, the spoilers are secured to the pipeline using a conventional seat and fin arrangement as shown in FIGS. 6–8. A cross-section of a conventional spoiler seat such as may be used with the present invention is shown in FIG. 6. The seat has two body members 210, each body member having a plurality of ribs 212 that rest against the outer surface of a pipeline when the seat is placed on the pipeline. Between the two body members 210, the seat has a groove 214 for receiving a fin.

Figure 10:
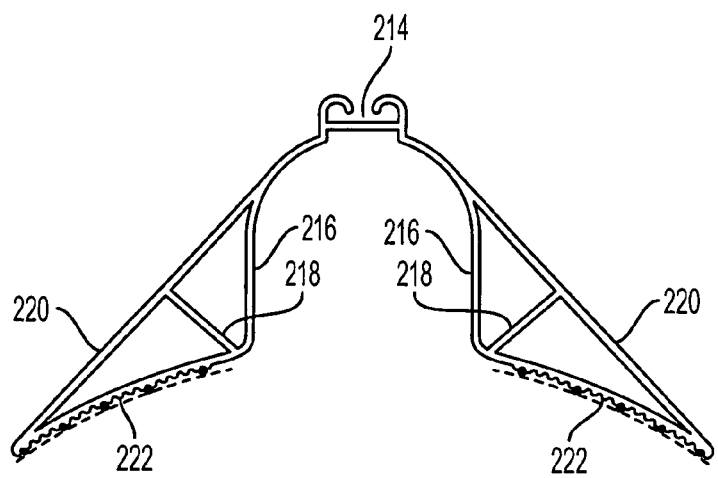
FIG. 10 is a cross-sectional view of a piggy-back seat for use with a spoiler for self-burial and stabilization of two conduits or pipelines.

Further, the spoiler seat may be a piggy-back style seat such as is shown in FIG. 10 or of any other structure that would sufficiently support a fin. The piggy-back style of seat shown in FIG. 10 has inner side members 216 that create a concave portion for receiving a pipe of smaller diameter than the pipeline. The piggy-back seat further has outer side members 220, support members 218, and a groove 214.

A conventional fin that may be used in the present invention is shown in FIGS. 7–8. FIG. 7 shows a side view of a fin 300 having a plurality of openings 320 therein for receiving bands or straps that secure the spoiler assembly to a pipeline. Although FIG. 7 shows the ends of the fin to be angles, other arrangements of the ends of the fins, such as squared or curved, may be employed. FIG. 8 shows a cross-section of fin 300. The fin has a tapered section 310 and a base section 330. The fin base section 330 is formed with enlarged portions 340 to slide into the groove 214 in the seat shown in FIG. 6.

Figure 9:
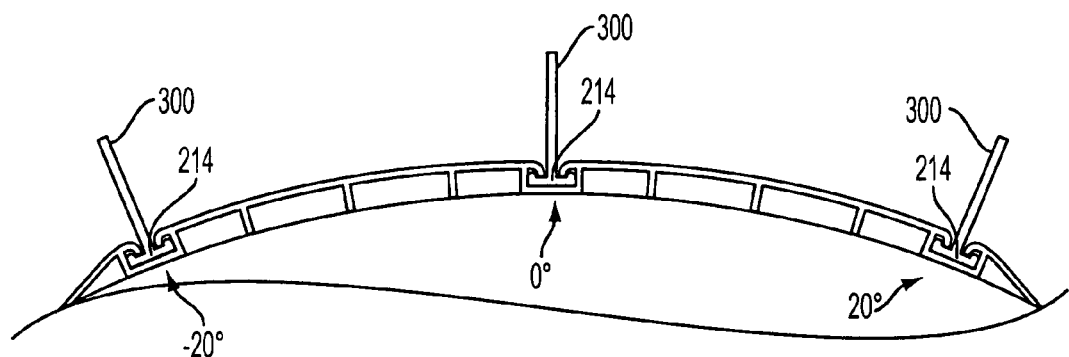
FIG. 9 is a cross-sectional view of an embodiment of a spoiler seat in accordance with the present invention.

In a second embodiment, the present invention is incorporated by way of a new seat template as shown in FIG. 9. This new seat template has three grooves for receiving fins. In FIG. 9, the grooves are spaced radially by 20 degrees, but in practice may be spaced at other radial intervals as desired. It likewise is possible to provide two or more than three groove radially spaced on the seat. With a triple seat of the type shown in FIG. 9, one can achieve the alternating fin placement shown in FIG. 4 using the same triple seat design for each spoiler and placing the fins in the various grooves in the seat.

Figure 11:
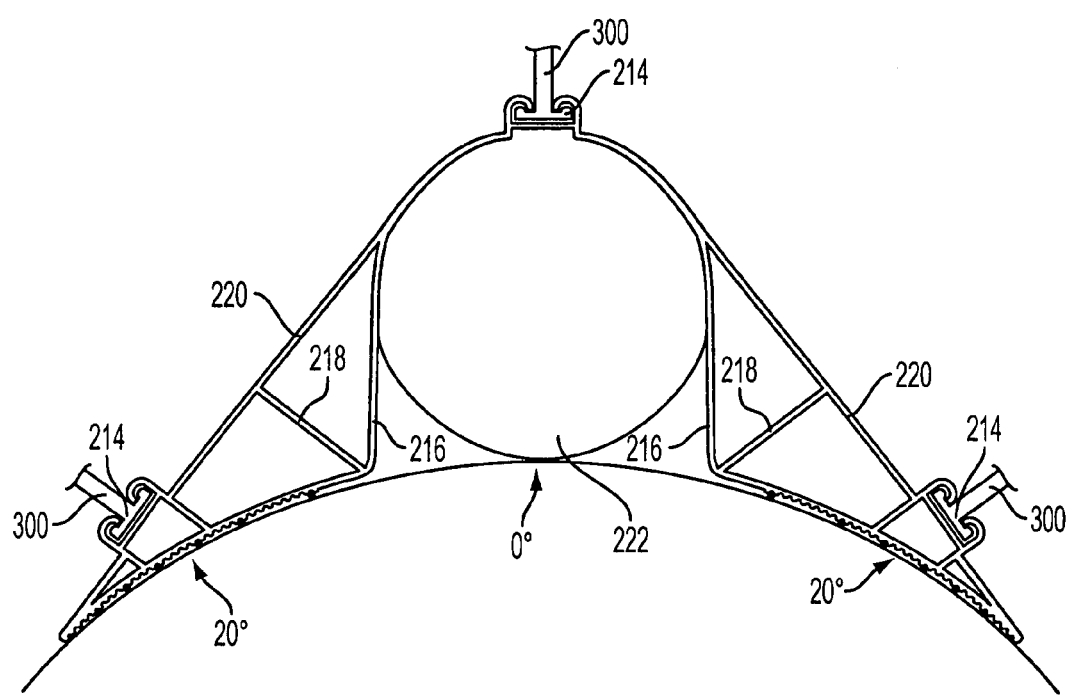
FIG. 11 is a cross-sectional view of a triple piggy-back seat for use with a spoiler for self-burial and stabilization of two conduits or pipelines.

In a third embodiment, a piggy-back seat structure such as is shown in FIG. 10 may be incorporated into a triple seat such as is shown in FIG. 9 to provide for both piggy-backing of a pipe on top of the pipeline and for alternating fin placement as shown in FIG. 4. Such a triple piggy-back seat is shown in FIG. 11. The triple piggy-back seat has three grooves 214 for receiving fins 300, with the grooves being spaced radially by 20 degrees. The seat further has inner side members 216 forming a concave portion for receiving the piggy-back pipe 222, outer side members 220, and support members 218. The grooves, of course, may be spaced radially at angles different than 20 degrees. Likewise, more grooves could be used if such was desirable for particular environmental conditions. Further, other structures of support members, outer sides, and inner sides may be used.

Figure 12:
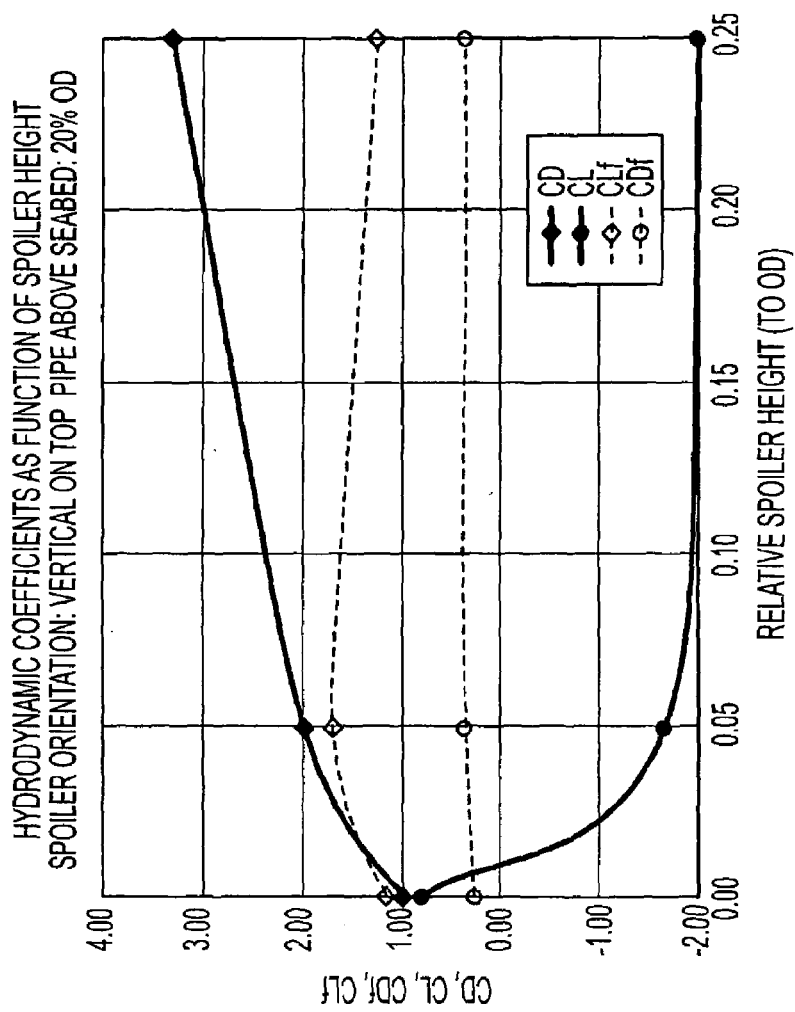
FIG. 12 is a graph of the hydrodynamic coefficients as a function of spoiler height in accordance with conventional alignment of a spoiler.

FIG. 12 is a graph of the hydrodynamic coefficients as a function of spoiler height. This graph generally shows how a spoiler on a pipeline reduces vortex-induced vibration. The x-axis of the graph shows the spoiler height as a percentage of the outer diameter of the conduit or pipeline. The Y axis indicates the hydrodynamic coefficient. The solid line CD represents the drag while the solid line CL represents the lift. One can see from the graph that the drag coefficient increases as the spoiler height increases. The lift coefficient begins as slightly positive with a 0 spoiler height and becomes increasingly negative as the spoiler height increases. The dashed lines represent the fluctuations in the amplitude of vibrations in the conduit as the spoiler height increases. One can see that as the spoiler height increases, the fluctuation of the amplitudes of vibration initially increase but then decrease.

Figure 13:
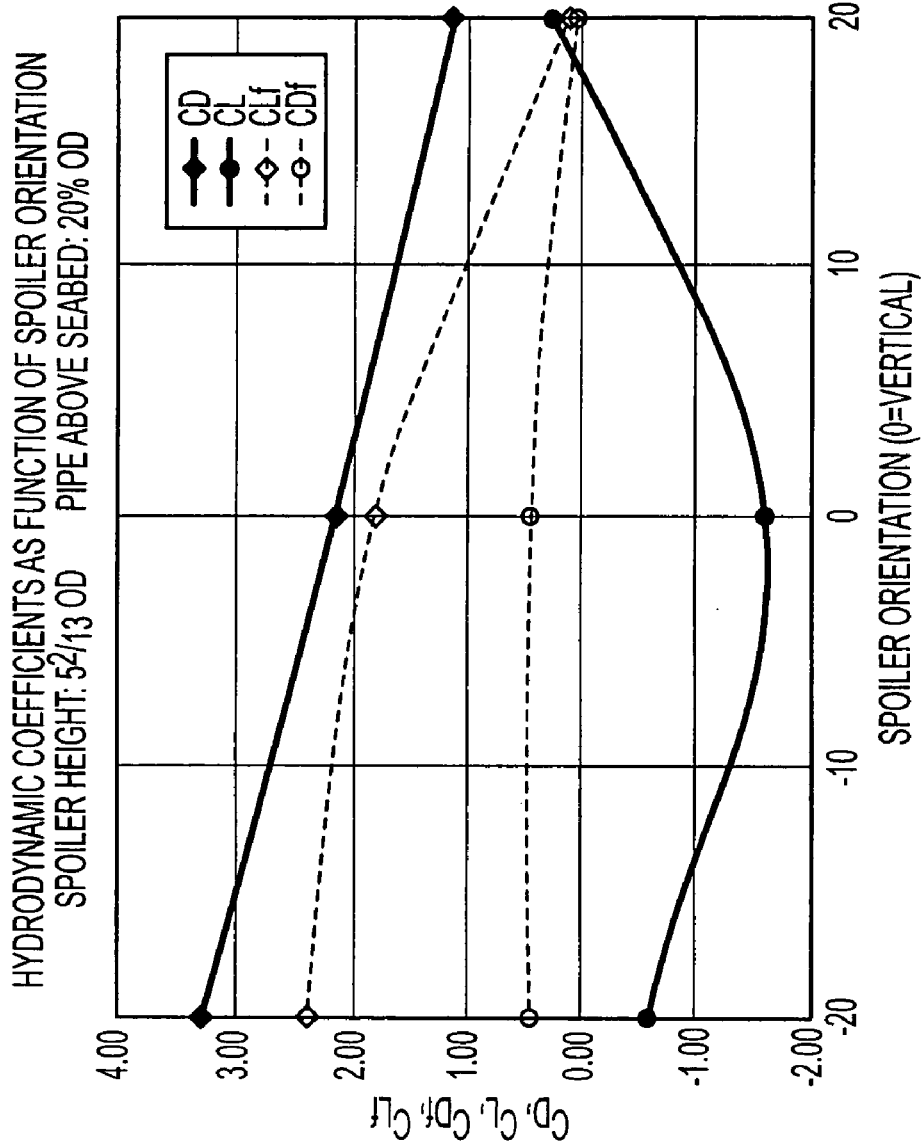
FIG. 13 is a graph of the hydrodynamic coefficients as a function of spoiler orientation in accordance with the present invention.

FIG. 13 is a graph of the hydrodynamic coefficients as a function of spoiler orientation for a spoiler height of 5% of the outer diameter of the pipeline and the distance of the pipeline of the seabed at 20% of the outer diameter of the pipeline. One can see that as the spoiler orientation approached 20 degrees down-current, the drag coefficient CD decreases significantly and the amplitudes of vibration of the pipeline approach zero. Since the water flow in many environments varies in multiple directions, the present invention incorporates alternating orientation of spoilers, thereby reaping the benefits of reduced vibration and increased burial action regardless of the direction of flow of the water.

While the foregoing invention has been described in terms of its preferred embodiments, it should be understood that various modifications may be made thereto without departing from the spirit and scope of the invention as defined in the appended claims. It is intended that all such modifications fall within the scope of the appended claims.

What is claimed is:

1. A method for promoting self-burial of a conduit in the bottom of a water bed, comprising the steps of:
    providing a first seat on a first portion of a conduit, said first seat having first, second and third grooves therein parallel to said first portion of said conduit for receiving protruding parts, said first groove being approximately over dead center along said first portion of said conduit, said second groove being radially spaced approximately 10–30° from said first groove in a first direction, and said third groove being radially spaced approximately 10–30° from said first groove in a direction opposite said second groove;
    providing a first protruding part in said first groove in said first seat;
    providing a second seat on a second portion of a conduit, said second seat having first, second and third grooves therein parallel to said second portion of said conduit for receiving protruding parts, said first groove being approximately over dead center along said second portion of said conduit, said second groove being radially spaced approximately 10–30° from said first groove in a first direction, and said third groove being radially spaced approximately 10–30° from said first groove in a direction opposite said second groove;
    providing a second protruding part in said second groove in said second seat;
    providing a third seat on a third portion of a conduit, said third seat having first, second and third grooves therein parallel to said third portion of said conduit for receiving protruding parts, said first groove being approximately over dead center along said third portion of said conduit, said second groove being radially spaced approximately 10–30° from said first groove in a first direction, and said third groove being radially spaced approximately 10–30° from said first groove in a direction opposite said second groove; and
    providing a third protruding part in said third groove in said third seat.

2. A method according to claim 1 further comprising the step of:
    providing a fourth seat on a fourth portion of a conduit, said fourth seat having first, second and third grooves therein parallel to said fourth portion of said conduit for receiving fins, said first groove being approximately over dead center along said second portion of said conduit, said second groove being radially spaced approximately 10–30° from said first groove in a first direction, and said third groove being radially spaced approximately 10–30° from said first groove in a direction opposite said second groove; and
    providing a fourth protruding part in said first groove in said fourth seat.

3. A method according to claim 1 wherein said step of providing a second seat comprises securing said second seat to said conduit at a longitudinal distance along said conduit of at least four inches from said first seat.

4. A method according to claim 1 further wherein said first protruding part comprises a fin and means for permitting water flow through at least a portion of said fin.

5. A method according to claim 4 wherein said step of providing a second seat comprises securing said second seat to said conduit at a longitudinal position along said conduit approximately adjacent to a longitudinal position of first seat.

6. A method according to claim 1 wherein said step of providing a second protruding part comprises securing said second protruding part to said second seat at a longitudinal distance along said conduit approximately four inches from said first protruding part.

7. A method according to claim 1 wherein said step of providing a third protruding part comprises securing said third protruding part to said conduit at a longitudinal distance along said conduit of at least four inches from said second protruding part.

8. A method according to claim 1 wherein said first and second protruding parts each comprises a fin.

9. A method according to claim 1 wherein said first, second and third portions of a conduit are a plurality of adjoined sections of pipe.

10. A method for providing stability for a conduit in the bottom of a water bed, comprising the steps of:
    providing a first seat on a first portion of a conduit, said first seat having first and second grooves therein parallel to said first portion of said conduit for receiving protruding parts, said first groove being approximately over dead center along said first portion of said conduit and said second groove being radially spaced approximately 10–30° from said first groove;

providing a first of the protruding parts in said first groove;

providing a second of the protruding parts in said second groove.

11. A method according to claim 10 wherein said providing stability for a conduit comprises at least one of:

stimulating self-burial of said conduit;

reducing vortex-induced vibration of said conduit; and preventing upheaval buckling of said conduit.

* * * * *